United States Patent [19]

Hara

[11] 4,129,858
[45] Dec. 12, 1978

[54] PARTITIONED DISPLAY CONTROL SYSTEM

[75] Inventor: Toshitaka Hara, Hitachi, Japan

[73] Assignee: Hitachi, Ltd., Japan

[21] Appl. No.: 780,497

[22] Filed: Mar. 23, 1977

[30] Foreign Application Priority Data

Mar. 25, 1976 [JP] Japan ................................. 51-32997

[51] Int. Cl.² ............................................. G06F 3/14
[52] U.S. Cl. .............................. 340/324 AD; 340/154
[58] Field of Search ................. 340/324 AD, 154, 152

[56] References Cited

U.S. PATENT DOCUMENTS

| | | | |
|---|---|---|---|
| 3,643,252 | 2/1972 | Roberts, Jr. | 340/324 AD |
| 3,648,270 | 3/1972 | Metz et al. | 340/154 |
| 3,686,662 | 8/1972 | Blixt et al. | 340/324 AD |
| 3,792,462 | 2/1974 | Casey et al. | 340/324 AD |

*Primary Examiner*—Marshall M. Curtis
*Attorney, Agent, or Firm*—Craig & Antonelli

[57] ABSTRACT

A system for controlling display of characters on partitioned regions of a CRT display surface comprising a refresh memory having a capacity enough to store application display data for exhibiting application display on the entire area of the CRT display surface, and a special display data memory storing special display data for exhibiting special display on a limited specific region, for example, the lowest and second lowest display line portions of the CRT display surface to be pointed by a light pen. In the system, elements including a data selector, a comparator, a register and a flip-flop are provided to switch over the data input to the CRT unit so that, when the special display is not required, the data stored in the refresh memory are solely read out to exhibit the application display on the entire area of the CRT display surface, while when the special display is required, the data stored in the special display data memory are read out to exhibit the special display on the specific display region during scanning of this specific display region of the CRT display surface.

8 Claims, 15 Drawing Figures

FIG. 1
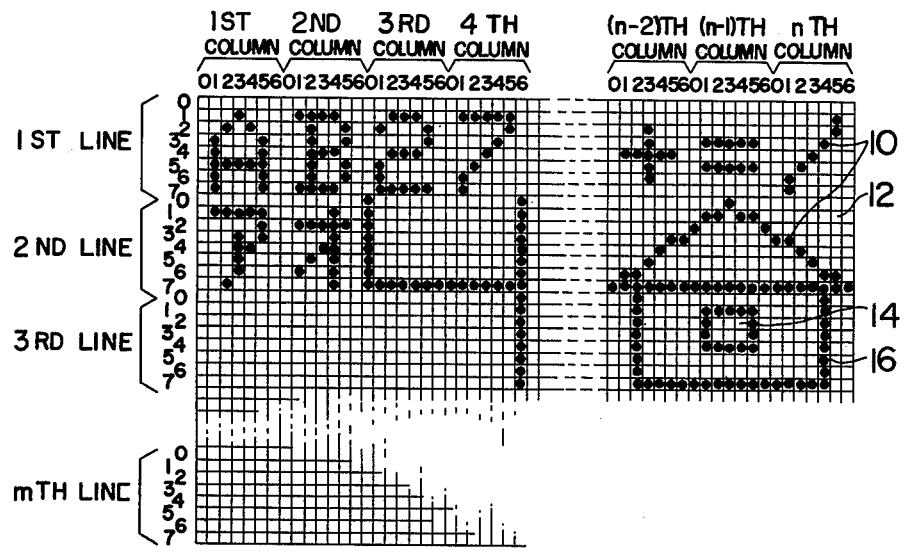
FIG. 2      FIG. 3
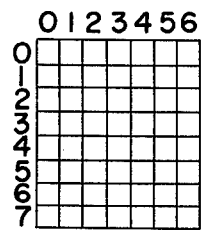 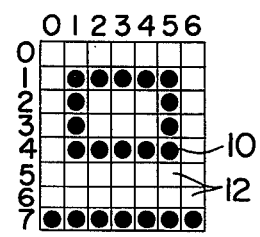
FIG. 5
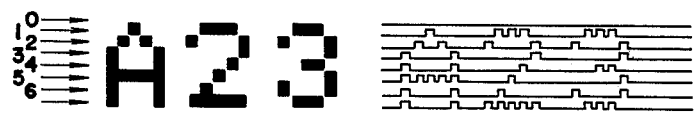
FIG. 6
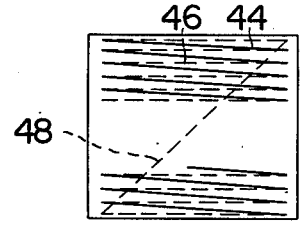

FIG. 7A
FIG. 7B
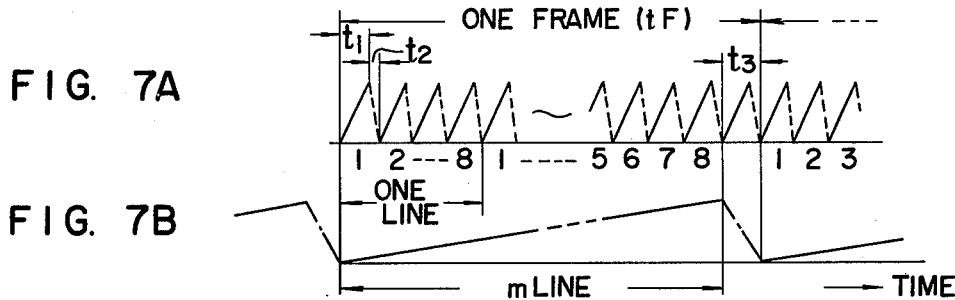
FIG. 8
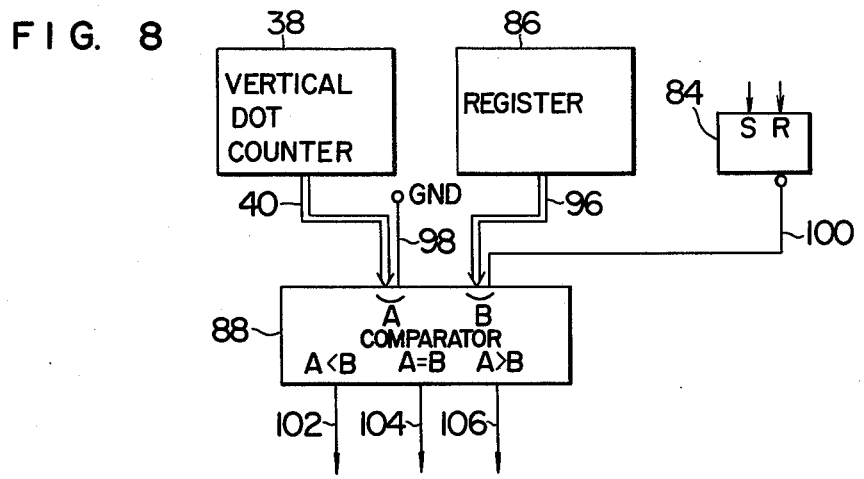
FIG. 9
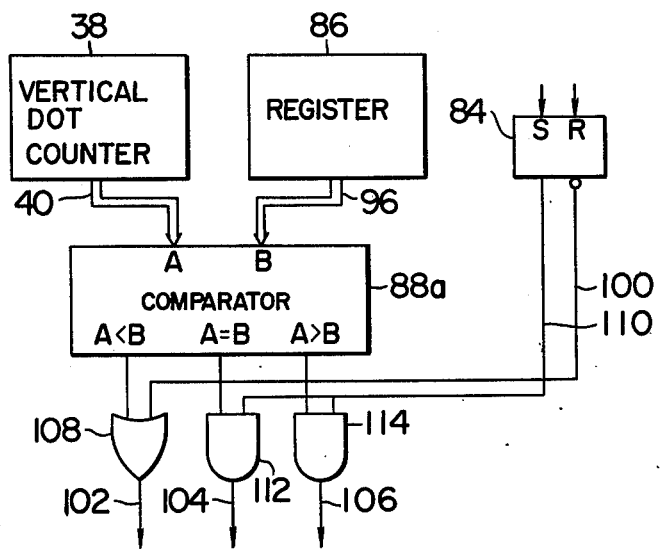

PARTITIONED DISPLAY CONTROL SYSTEM

BACKGROUND OF THE INVENTION

This invention relates to a partitioned display control system for controlling exhibition of different kinds of display on partitioned regions of a display surface of a refresh type display unit such as a CRT display unit with which an element such as a light pen can be used to renew or remove any desired portion of display.

A pattern display unit such a CRT display unit does not possess the function of storing information in itself. Such a pattern display unit is therefore generally provided with a refresh memory which has data storage locations or addresses corresponding in a one-to-one relationship to the unit display regions of the display surface, so that data stored in the storage locations or addresses can be read out in synchronism with scanning of the display surface of the CRT display unit. Display data which specifies characters such as letters or patterns to be displayed on the unit display regions is externally supplied to be written in this refresh memory. The display data is read out in synchronism with the scanning of the display surface of the CRT display unit, and this data is combined with a character signal generated by a character generator to provide a picture signal. This picture signal is displayed on the display surface of the CRT display unit in a conventional manner. Such display data, which is externally written in the refresh memory to be displayed on the display surface of the CRT display unit in usual manner, is generally called application display data, and this kind of display is generally called application display.

A keyboard or a light pen is commonly used for displaying a new character on the display surface or erasing a portion of characters displayed already on the display surface according to the application display. When the light pen is used for the above purpose, display of a group of light buttons to be pointed by the light pen, that is, special display is required. This special display generally comprises control display and marker display. The term "control display" refers to the display of a group of light buttons including a light button used for controlling the movement of a cursor specifying a unit display region of the application display area for displaying or erasing a character on or from the unit display region, a light button used for setting the size of a character to be displayed, a light button used for causing parallel movement of all the characters on the application display area, and a light button used for the selective display of a character block when a group of characters to be displayed on the application display area are divided into a plurality of blocks and one of these blocks is to be displayed. The term "marker display" refers to the display of a group of characters to be pointed by the light pen when desired characters are to be displayed on the application display area.

According to a prior art proposal which is directed to the control display and marker display required for pointing by the light pen, a hardware circuit associated exclusively with the light pen is provided independently of that associated with the aforementioned refresh memory so as to control the exhibition of the control display and marker display on the display surface of the CRT display unit.

In the case of such prior art proposal, however, the display system including the refresh memory used for the application display operates independently of the display system including the hardware circuit associated with the light pen used for the special display, so that the application display and special display are exhibited on the fixed display region of the CRT display unit. Therefore, the display surface of the CRT display unit must necessarily be distinctly partitioned into an application display region and a special display region. In other words, the display surface region available for the application display is limited due to the necessity for additional exhibition of the special display including the control display and marker display. Thus, the prior art proposal results in a great problem is that, on one hand, the display surface of the CRT display unit whose area is difficult to be increased is not fully effectively utilized for the application display, and on the other hand, part of the memory region of the refresh memory is left non-utilized.

According to another prior art proposal made in an attempt to solve the above problem, the refresh memory is adapted to store application display data in sufficient quantity to cover the entire display surface area of the CRT display unit, and the special display interrupts the application display under control of externally prepared software. In the case of this method, however, it is necessary to manage and control the operation to prevent concurrence of the special display and application display, and a very complex software program is required therefor. According to still another prior art proposal, a pair of refresh memories are provided to be used for the application display and special display, respectively. In the case of this last-mentioned method too, extreme difficulty is encountered in the preparation of a suitable software program and management of operation for preventing concurrence of the application display and special display, as in the former method.

SUMMARY OF THE INVENTION

It is therefore a primary object of the present invention to solve the aforementioned prior art problems and to provide a novel partitioned display control system which permits fully effective utilization of the entire area of the display surface for the application display and special display without the accompanying difficulty of software preparation.

According to one of the important features of the present invention, application display data sufficient to produce an application display on the entire display surface is stored in a refresh memory to be read out therefrom to provide the application display. When the special display such as the control display or marker display pointed by a hardware element such as a light pen is required, the display surface is partitioned into an application display region and a special display region for the application display and special display respectively. Of course, the entire area of the display surface can be used for the application display when such special display is not required. Further, regardless of whether or not the special display is required, all the regions of the refresh memory storing the application display data are externally accessible.

In accordance with one embodiment of the present invention, a register is provided which stores a boundary value representing or specifying the boundary between a special display surface region of a CRT display unit for exhibiting the special display, including the control display required for system management and the marker display required for pointing with a light pen, and an application display surface region of the CRT display unit for exhibiting the application display. The boundary value stored in this register is compared in a comparator with the contents of a horizontal or vertical address counter. The result of comparison by the comparator indentifies that the scanning beam is moving on the boundary line or the zone upper or lower than the boundary line on the display surface of the CRT display unit. These three kinds of output signals are applied to a data selector as a control input, and application display data read out from a refresh memory and separately prepared control display data and marker display data are suitably selected by the data selector so that the application display, control display and marker display can be exhibited on the partitioned regions of the display surface of the CRT display unit. A mode specifying flip-flop is provided for switch-over between the special display mode in which the application display, control display and marker display occupy the partitioned regions of the display surface and the application display mode in which the application display solely occupies the entire area of the display surface. The output of this flip-flop controls the comparator for effecting the switch-over between the two modes above described.

The above and other objects, features and advantages of the present invention will become more apparent from the following detailed description of preferred embodiments thereof taken in conjunction with the accompanying drawings.

BRIEF DESCRIPTION OF THE DRAWINGS

FIG. 1 illustrates characters displayed on a CRT display surface.

FIG. 2 shows a unit display region of the CRT display surface.

FIG. 3 shows a pattern of dots appearing in the unit display region shown in FIG. 2.

FIG. 5 to 7B illustrate how characters are displayed on the CRT display surface according to the present invention.

FIGS. 8 and 9 are block diagrams of respectively different forms of connection arrangement of means for producing a signal for partitioning the display surface into regions.

DETAILED DESCRIPTION OF THE PREFERRED EMBODIMENTS

FIG. 1 illustrates characters display on a display surface of a CRT display unit. Referring to FIG. 1, the display surface is divided into n columns and m lines providing (m × n) unit display regions. As shown in FIG. 2, each unit display region includes, for example, (seven columns) × (eight lines) = 56 dots. On the 1st line in FIG. 1, letters and patterns "AB27 ... + = 1" are shown displayed when read from the left-hand side. Similarly, on the 2nd line in FIG. 1, letters and patterns "7⋆ ⊔ ... Δ" are shown displayed when read from the left-hand side. Patterns other than letters are shown displayed, for example, on the 3rd and 4th columns in the 2nd line and on the (n−2)th to nth columns in the 3rd line in FIG. 1. For example, the pattern portions appearing on the (n−1)th column in the 3rd line in FIG. 1 can be displayed by dots in a manner as shown in FIG. 3. Referring to FIG. 3, dots 10 are illuminating while dots 12 are not illuminating on a unit display region to represent a pattern of a window 14 in FIG. 1. Lines 16 in FIG. 1 represent a pattern of a house provided by six unit display regions.

Figure 4:
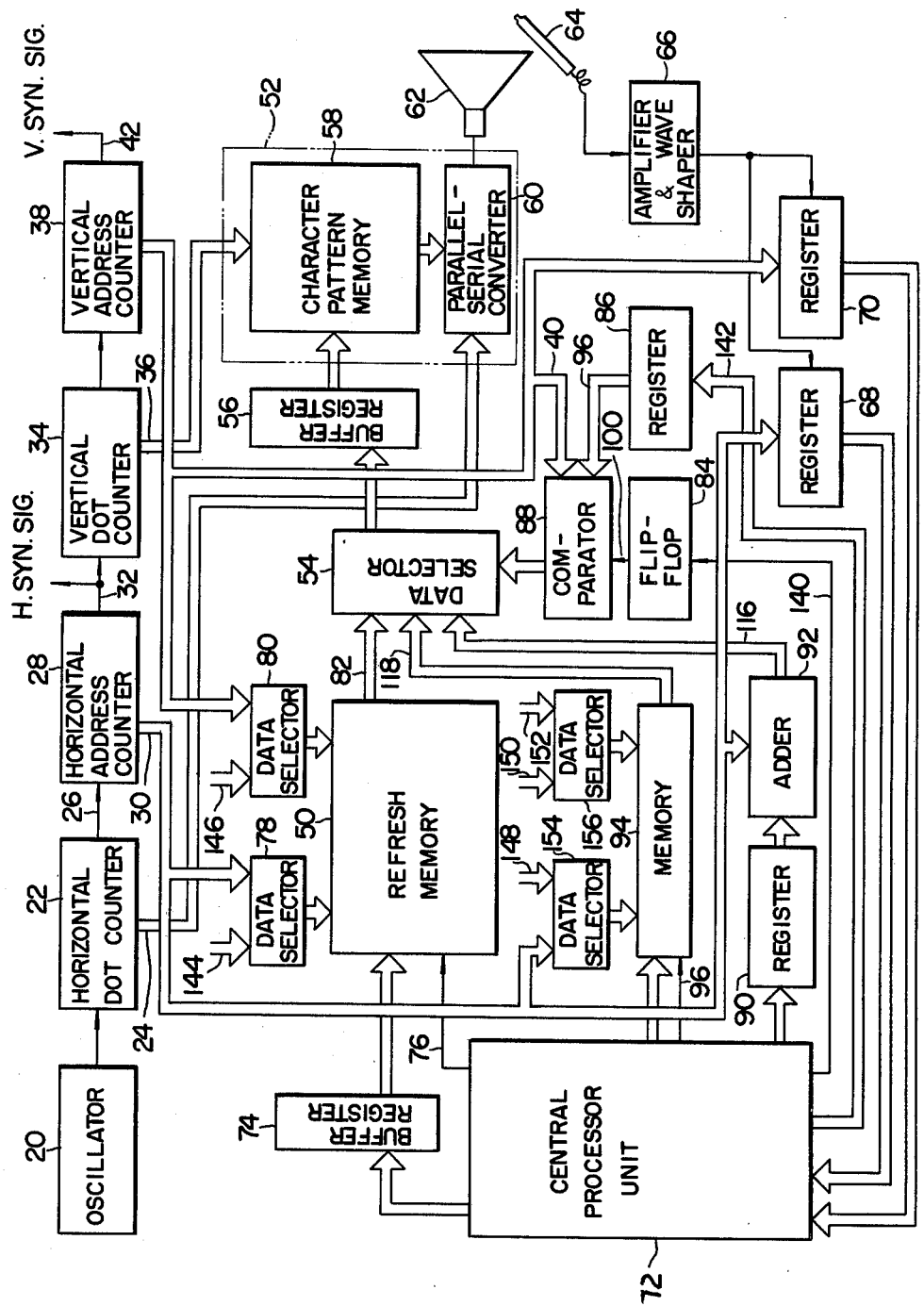
FIG. 4 is a block diagram of an embodiment of the present invention.

FIG. 4 is a block diagram showing the general structure of a preferred embodiment of the control system according to the present invention. An oscillator 20 in FIG. 4 generates a train of clock pulses. A horizontal dot counter 22 counts the number of clock pulses applied from the oscillator 20, and its output representing the count appears on a signal transmission line 24. When the count of the horizontal dot counter 22 attains the value "6", a count-up pulse appears from the counter 22 on a signal transmission line 26, and at the same time, the counter 22 is cleared to start counting again. A horizontal address counter 28 counts the number of count-up pulses applied from the counter 22 by way of the signal transmission line 26, and its output representing the count appears on a signal transmission line 30. When the count of the counter 28 attains the value "n", a count-up pulse appears from the counter 28 on a signal transmission line 32, and at the same time, the counter 28 is cleared to start counting again. Therefore, the count of the horizontal address counter 28 represents the location of a unit display region in the horizontal direction, that is, the X-coordinate (abscissa) of the unit display region on the display surface of the CRT display unit. The count-up pulses of the horizontal address counter 28 provide a horizontal synchronizing signal.

The count-up pulses appearing from the horizontal address counter 28 are applied by way of the signal transmission line 32 to a vertical dot counter 34, and its output representing the count appears on a signal transmission line 36. When the count of the vertical dot counter 34 attains the value "7", the counter 34 applies a count-up pulse to a vertical address counter 38, and at the same time, the counter 34 is cleared to start counting again. The vertical address counter 38 counts the number of count-up pulses applied from the counter 34, and its output representing the count appears on a signal transmission line 40. When the count of the vertical address counter 38 attains the value "m", a count-up pulse appears from the counter 38 on a signal transmission line 42, and at the same time, the counter 38 is cleared to start counting again. Therefore, the count of the vertical address counter 38 represents the location of a unit display region in the vertical direction, that is, the Y-coordinate (ordinate) of the unit display region on the display surface of the CRT display unit. The count-up pulses appearing from the vertical address counter 38 provide a vertical synchronizing signal. The horizontal synchronizing signal appearing on the signal transmission line 32 and the vertical synchronizing signal appearing on the signal transmission line 42 are used as synchronizing signals during scanning of the CRT display surface with the raster.

The manner of character display shown in FIG. 1 will be described in more detail with reference to FIGS. 5 to 7.

FIG. 5 illustrates the scanning position and direction of eight raster lines 0 to 7 for displaying characters "A23". A pulse waveform diagram shown on the right-hand side of the characters "A23" in FIG. 5 represents the waveform of a luminance signal applied to the CRT display unit at the corresponding positions of the raster lines for displaying the characters "A23".

The display surface of the CRT display unit is scanned with the raster lines in a manner as shown in FIG. 6. This scanning produces horizontal scanning lines 44, horizontal fly-back lines 46, and a vertical fly-back line 48. In the horizontal scanning, a horizontal deflection signal of saw-tooth waveform is used which includes a horizontal scanning period $t_1$ and a horizontal fly-back period $t_2$ as shown in FIG. 7A. The number of raster lines is eight for each row as explained with reference to FIGS. 1 to 3, and one frame is composed of (8 × m) raster lines, since one frame or one scene is formed by m lines. As shown in FIG. 7B, a vertical deflection signal of saw-tooth waveform having a period $t_F$ corresponding to one frame is used, and its fly-back period has a duration $t_3$. The horizontal fly-back lines 46 and vertical fly-back lines 48 are blanked off to leave idle periods in these portions.

Referring to FIG. 4 again, the addresses of application display data stored in a refresh memory 50 are provided by the count outputs of the horizontal address counter 28 and vertical address counter 38 applied through data selectors 78 and 80 and represent the X-coordinates and Y-coordinates respectively on the display surface of the CRT display unit. The application display data read out from the refresh memory 50 is applied to a character generator 52 through a data selector 54 and a buffer register 56, and at the same time, the count outputs of the horizontal dot counter 22 and vertical dot counter 34 are applied to the character generator 52 by way of the signal transmission lines 24 and 36 respectively, so that a dot pattern for each character can be provided. This character generator 52 comprises a character pattern memory 58, and the data output of the refresh memory 50 and the count output of the vertical dot counter 34 is applied to this memory 58. The count output of the horizontal dot counter 22 is applied to a parallel-serial converter 60 so that the data corresponding to one dot row of a character read out from the character pattern memory 58 can be subjected to parallel-serial conversion, and the serial signal thus obtained can be applied to the cathode-ray tube 62 of the CRT display unit as a luminance signal.

When a light pen 64 is applied to the display surface of the CRT display unit, a pulse signal appears therefrom in response to the reception of light, since the light pen 64 is equipped with a light receiving element at its tip. This pulse signal is applied through an amplifier and wave shaper circuit 66 to a pair of registers 68 and 70 for setting the horizontal and vertical addresses in these registers. The pulse signal appears from the light pen 64 when the tip of the light pen 64 encounters the moving scanning beam. At this time, therefore, the counts of the horizontal and vertical address counters 28 and 38 set in the respective registers 68 and 70 represent the X-coordinate and Y-coordinate of the point pointed by the light pen 64. The signals representing the contents of these registers 68 and 70 are applied to a central processor unit 72 as a display command.

Application display data is supplied from the central processor unit 72 to the refresh memory 50 through a buffer register 74 to be written in the locations specified by the address signals applied from the horizontal and vertical address counters 28 and 38 through the data selectors 78 and 80. A writing instruction signal is applied, for this purpose, from the central processor unit 72 to the refresh memory 50 by way of a signal transmission line 76. A reading instruction signal is also applied from the central processor unit 72 to the refresh memory 50 by way of the signal transmission line 76, so that the contents in the locations specified by the address signal outputs of the horizontal and vertical address counters 28 and 38 appear on a signal transmission line 82 from the refresh memory 50. This data output appearing on the signal transmission line 82 is applied to the character generator 52 through the data selector 54 and buffer register 56.

The system according to the present invention is featured by the fact that it comprises, as essential components, a mode specifying flip-flop 84, a register 86 registering the location of the boundary line on the display surface when the display surface is to be partitioned into a plurality of regions, a comparator 88 comprising the output of the register 86 with the count output of the vertical address counter 38, and the aforementioned data selector 54 controlled by the output of the comparator 88. The boundary value is registered in the register 86 by a signal applied from the central processor unit 72 by way of a signal transmission line 142. The system according to the present invention is further featured by the fact that it comprises a marker display unit for displaying necessary characters stored in the character pattern memory 58 for the purpose of marker display, besides the refresh memory 50 used for the application display. This marker display unit comprises a register 90 registering block specifying pages or sections when all the characters are divided into a plurality of blocks, and an adder 92 adding the count output of the horizontal address counter 28 to the output of the register 90. The system is so arranged that the result of addition by the adder 92 provides the character data belonging to a block corresponding to a specified page, and during the change in the count of the horizontal address counter 28 within the range of 0 to n, the character data of the specified block are sequentially supplied to the data selector 54 by way of a signal transmission line 116. The system according to the present invention is further featured by the fact that it comprises a special display data memory 94 which is similar to the refresh memory 50 and is used exclusively for the purpose of displaying control data required for light pen pointing or system management. A writing instruction signal is similarly applied from the central processor unit 72 to this special display data memory 94 by way of a signal transmission line 96 so that special display data supplied from the central processor unit 72 can be written in this memory 94. This special display data memory 94 may have a capacity corresponding to one line on the display surface or a capacity corresponding to a plurality of lines. In the former case, address scanning is carried out according to the count output of the horizontal address counter 28, while in the latter case, such scanning is carried out according to the combination of the output of the horizontal address counter 28 and part of the output of the vertical address counter 38. The output of the special display data memory 94 is applied to the data selector 54 by way of a signal transmission line 118.

The structure and operation of principal circuit parts of the system according to the present invention will be described in detail with reference to FIGS. 8 to 12.

FIGS. 8 and 9 are block diagrams showing respectively different forms of the connection arrangement of the flip-flop 84, register 86, vertical address counter 38 and comparator 88 shown in FIG. 4. The operation of the circuit shown in FIG. 9 is entirely similar to that of the circuit shown in FIG. 8 in that the output of the mode specifying flip-flop 84 is used for the data selection control, except that the connection arrangement of the comparator 88a in the former circuit differs slightly from that of the comparator 88 in the latter circuit.

In the case of the comparator 88 in the circuit shown in FIG. 8, additional input lines 98 and 100 are connected to the comparator 88 on the higher bit side relative to the data input lines 40 and 96 respectively. The additional input line 98 associated with the data input line 40 connected to the vertical address counter 38 is grounded to provide "0". The additional input line 100 associated with the data input line 96 connected to the boundary register 86 is connected to the inverted output terminal of the flip-flop 84. When the display surface exhibits the application display in the usual manner, the mode specifying flip-flip 84 is reset by a reset signal applied from the central processor unit 72 by way of a signal transmission line 140, while when the display surface is partitioned to exhibit the marker display and control display together with the application display, the flip-flop 84 is set by a set signal applied from the central processor unit 72. In the reset state of the flip-flop 84 in FIG. 8, an input of "1" is applied to the comparator 88 by way of the input line 100. Thus, the value of the binary input applied to the side B of the comparator 88 is necessarily larger than that applied to the side A, and an output of "1" level appears on an output line 102, while outputs of "0" level appear on output lines 104 and 106. In the set state of the flip-flop 84, on the other hand, an input of "0" level is applied to the comparator 88 by way of the input line 100, and the data input applied from the register 86 is exactly compared in the comparator 88 with that applied from the vertical address counter 38.

The same applies to the circuit shown in FIG. 9. In the reset state of the flip-flop 84, an input of "1" level is applied to an OR gate 108 by way of an input signal line 100, and an output of "1" level appears necessarily on an output line 102 from the OR gate 108. In this reset state, an input of "0" level is applied to AND gates 112 and 114 by way of another input line 110, and outputs of "0" level appear necessarily on output lines 104 and 106 from the AND gates 112 and 114. In the set state of the flip-flop 84, an input of "1" level is applied by way of the input line 110, and an input of "0" level is applied by way of the input line 100. Thus, the exact result of comparison by the comparator 88a appears on the output lines 102, 104 and 106, as in the case of FIG. 8.

Figure 10:
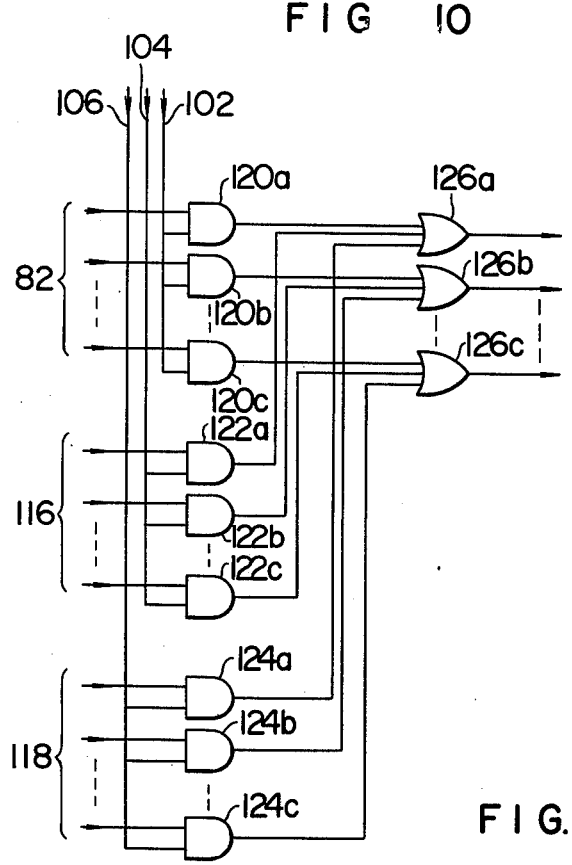
FIG. 10 is a circuit diagram of a data selector selecting character data for displaying the same in the individual partitioned regions of the display surface in accordance with the signal applied from the circuit shown in FIGS. 8 or 9.

FIG. 10 is a circuit diagram showing in detail the structure of the data selector 54 in FIG. 4. Referring to FIG. 10, control signal lines 102, 104 and 106 correspond respectively to the output lines 102, 104 and 106 in FIGS. 8 and 9. Data input lines 82, 116 and 118 in FIG. 10 correspond respectively to the data output line 82 connected to the refresh memory 50, the data output line 116 connected to the adder 92 providing a coded output for the marker display and the data output line 118 connected to the special display data memory 94 providing a coded output for the control display. A plurality of sets of AND gates 120a to 120c, 122a to 122c, and 124a to 124c are provided to selectively pass the data inputs, and the selected data input is applied through one of the OR gates 126a to 126c to the buffer register 56 in FIG. 4. The data input thus set in the buffer register 56 provides the address input to the character generator 52, so that an output representing the character pattern to be displayed appears from the character generator 52.

Figure 11A:
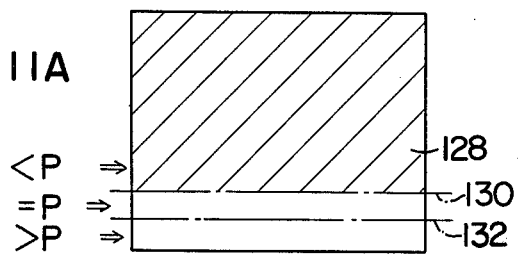
FIGS. 11A to 12 illustrate the partitioned regions of the CRT display surface.
Figure 11B:
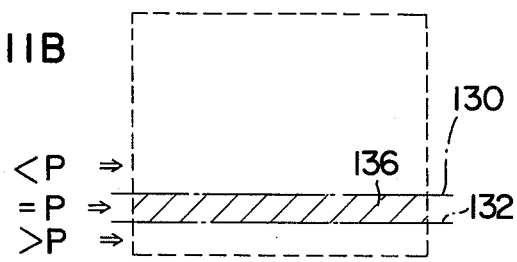
Figure 11C:
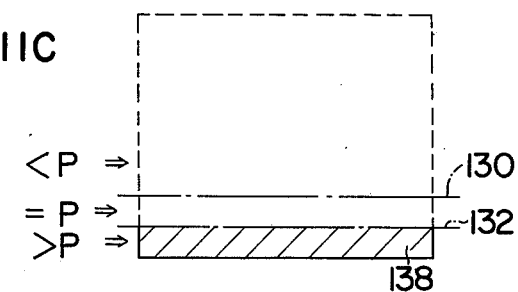
Figure 12:
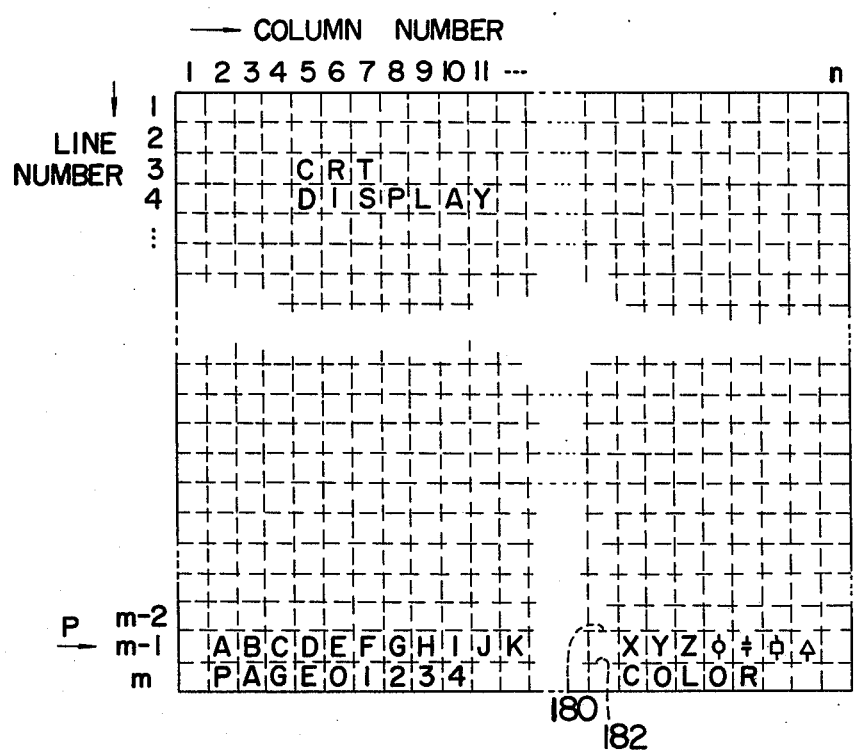

Exhibition of the special display in the preferred embodiment of the system according to the present invention will be described with reference to FIGS. 11 and 12. FIGS. 11A, 11B and 11C illustrate how the application display, marker display and control display are exhibited on the single display surface of the CRT display unit. FIG. 11A illustrates the display surface region used for the application display displayed on the basis of the contents of the refresh memory 50. FIG. 11B illustrates the display surface region used for the marker display displayed on the basis of the result of addition of the output of the page or section specifying register 90 to the output of the horizontal address counter 28 by the adder 92. FIG. 11C illustrates the display surface region used for the control display displayed on the basis of the contents of the special display data memory 94. The boundary value P registered in the register 86 represents the (m−1)th row in this case. In the hatched portion 128 in FIG. 11A, the line number is necessarily less than P, and this portion 128 provides the application display region ranging from the 1st line to the (m−2)th line on the CRT display surface. The surface portion beneath the line 130 in FIG. 11A may not be used for the application display in this case. The characters, which are specified on the basis of the result of addition of the data outputs of the page or section specifying register 90 and horizontal address counter 28, are displayed on the line represented by the boundary value P registered in the register 86, that is, on the portion 136 or (m−1)th row between the lines 130 and 132 in FIG. 11B. The characters, which are specified on the basis of the contents of the special display data memory 94 in FIG. 4, are displayed on the portion 138 or mth line beneath the line 132 in FIG. 11C. Therefore, when the mode specifying flip-flop 84 is maintained in the set state in FIG. 4, and the count of the vertical address counter 38 increases in synchronism with the scanning with the scanning beam, the output of the comparator 88 varies depending on the result of comparison between the output of the counter 38 and that of the register 86, so that the application display, marker display and control display are exhibited on the individual display surface regions partitioned by the lines 130 and 132 as shown in FIGS. 11A, 11B and 11C. Thus, as shown in FIG. 12, the application display based on the contents of the refresh memory 50 is exhibited on the region ranging from the 1st row to the (m−2)th line, and the marker display based on the contents of the page or section specifying register 90 is exhibited on the region corresponding to the (m−1)th line, while the control display based on the contents of the special display data memory 94 is exhibited on the region corresponding to the mth line.

The operation of the preferred embodiment of the system according to the present invention will now be briefly summarized. The mode specifying flip-flop 84 is set or reset by the set or reset signal applied from the central processor unit 72 by way of the signal transmission line 140, and the resultant output of the flip-flop 84 is applied to the comparator 88 by way of the input line 100 so as to determine the display mode. Depending on the display mode, the application display is exhibited on the entire area of the display surface of the CRT display unit or such surface is partitioned to exhibit also the special display. The boundary value is set in the register 86 by the signal applied from the central processor unit 72 by way of the signal transmission line 142, and the output of the register 86 is applied to the comparator 88 by way of the signal transmission line 96 to be compared with the output of the vertical address counter 38. The resultant output appearing from the comparator 88 on the output lines 102, 104 and 106 in FIGS. 8 and 10 is used to control the data selector 54. Thus, when the mode specifying flip-flop 84 is in the set state, the output of the data selector 54 provides the application display, marker display and control display shown in FIG. 12.

Address input lines 144 and 146 may be used to externally apply the address information to the refresh memory 50 through the data selectors 78 and 80 in FIG. 4. Similarly, data input lines 148 and 150 may be used to externally apply the special display data to the memory 94 through data selectors 154 and 156 in FIG. 4. The signal transmission line 40 transmitting the output of the vertical address counter 38 specifying the line number may be connected to an additional input line 152 connected to the data selector 156 when the number of lines occupied by the special display provided by the output of the special display data memory 94 is not less than two.

The present invention is in no way limited to the aforementioned specific embodiment, and various changes and modifications may be made therein without departing from the scope of appended claims.

For example, in lieu of the counter arrangement shown in FIG. 4, in which the horizontal deflection frequency is selected to be higher than the vertical deflection frequency, the positions of the horizontal dot counter 22 and vertical dot counter 34 as well as those of the horizontal address counter 28 and vertical address counter 38 may be reversed from the relation shown in FIG. 4. In such a case, the display surface is partitioned in the vertical direction in FIGS. 11 and 12, and such partitioning does not provide any inconvenience for the attainment of the object of the present invention. For the practice of the present invention, therefore, it is preferably that the display surface of the CRT display unit can be partitioned in any one of the horizontal and vertical directions as desired considering the convenience of the user. Further, although the memory 94 in FIG. 4 is designed to store special display data corresponding to only one line, it may be adapted to store data corresponding to a plurality of lines by connecting the output line 40 of the vertical address counter 38 to the additional input line 152 of the data selector 156 as above described.

It will be apparent from the foregoing detailed description that the partitioned display control system according to the present invention provides the following remarkable advantages:

(1) The maximum displayable area of the display surface can be utilized for the application display, and yet, the special display such as the marker display for the light pen and the control display for the light pen pointing or system management can be exhibited as desired without in any way altering the contents of the refresh memory used for the application display.

(2) The refresh memory storing the application display data is externally accessible regardless of whether the special display is presented on the display surface or not.

(3) The special display can be exhibited on the display surface in addition to the application display as desired by the action of the data selection control elements including the mode specifying flip-flop independently of other control elements. Therefore, preparation of software is facilitated to provide a variety of modes for the control and utilization of the CRT display unit.

(4) A minimum of hardware units are required for the attainment of the aforementioned excellent functions, and the system according to the present invention can be made at a relatively low cost.

I claim:

1. A system for controlling display of characters on a display surface comprising display means for sequentially displaying characters on said display surface in response to continuous receipt of input data, a refresh memory having a capacity sufficient to store application display data for producing an application display of characters on the entire area of said display surface in an application display mode of operation, a special display data source supplying special display data for producing a special display of characters on a limited region of said display surface in a special display mode of operation, and data selection control means connected to said refresh memory and said special display data source for effecting alternative selection of the application display data read out from said refresh memory to produce an application display on the entire area of said display surface or the sequential selection of said application display data and said special display data to produce a special display on said limited region and an application display only on the remaining region of said display surface.

2. A display control system as claimed in claim 1, wherein said data selection control means comprises means for setting the boundary value representing the location of the boundary between said application display region and said limited display region, means for generating timing pulses for controlling the scanning of the display surface, counter means for counting the number of timing pulses used for the scanning of the display surface of said display means, means for comparing said boundary value with the output of said counter means thereby discriminating between the application display mode and the special display mode, and means for carrying out the alternative selection of the application display data and the special display data depending on the output of said comparing means.

3. A display control system as claimed in claim 2, wherein said data selection control means further comprises mode selection means for controlling said comparing means so that said comparing means carries out the aforesaid comparison when set by said mode selection means, to initiate said special display mode of operation and is inhibited from carrying out the aforesaid comparison when reset to initiate said application display mode of operation, thereby permitting supply of the application display data only to said display means.

4. A display control system as claimed in claim 1, further including a light pen capable of detecting light at a selected position on said display surface, and means responsive to said light pen for initiating said special display in the form of a marker display and control display.

5. A display control system as claimed in claim 2, wherein said special display data source comprises an adder by which data specifying the unit display regions to be used presently for the application display of characters are added to data specifying each of individual blocks provided by dividing characters used for the marker display into a plurality of blocks, thereby providing the marker display data to be exhibited on said display surface.

6. A display control system as claimed in claim 2, wherein said special display data source comprises a further memory into which control display data used for a control display can be externally written for storage therein.

7. A display control system as claimed in claim 1, wherein said special display data source provides marker display data and control display data, and said data selection control means comprises storage means for storing data specifying the display region of either of said marker display and said control display on the display surface of said display means, means for generating timing pulses for controlling the scanning of the display surface, counter means counting the number of timing pulses used for the scanning of the display surface of said display means, means for comparing the data stored in said storage means with the output of said counter means thereby discriminating whether said count is less than, equal to or more than said data, and means for effecting the alternative selection of the application display data, marker display data and control display data depending on the result of discriminating by said comparing means thereby supplying the selected data as the input data to said display means.

8. A display control system as claimed in claim 7, wherein said data selection control means further comprises mode selection means for controlling said comparing means so that said comparing means carries out the aforesaid comparison when set by said mode selection means to initiate said special display mode of operation and is inhibited from carrying out the aforesaid comparison when reset to initiate said application display mode of operation, thereby permitting supply of the application display data only to said display means.

* * * * *